Dec. 26, 1961 M. T. HARVEY ET AL 3,014,530
COMPOSITIONS OF MATTER AND METHODS AND STEPS
FOR MAKING AND USING THE SAME
Filed Aug. 20, 1957 2 Sheets-Sheet 1

Inventors
MORTIMER T. HARVEY
and PETER L. ROSAMILIA
By Angelo M. Pisarra
Attorney Dec. 26, 1961 M. T. HARVEY ET AL 3,014,530
COMPOSITIONS OF MATTER AND METHODS AND STEPS
FOR MAKING AND USING THE SAME
Filed Aug. 20, 1957 2 Sheets-Sheet 2

Inventors
MORTIMER T. HARVEY
and PETER L. ROSAMILIA
By Angelo M. Pisarra
Attorney

United States Patent Office 3,014,530
Patented Dec. 26, 1961

3,014,530
COMPOSITIONS OF MATTER AND METHODS AND STEPS FOR MAKING AND USING THE SAME
Mortimer T. Harvey, South Orange, and Peter L. Rosamilia, Newark, N.J., assignors to Harvel Research Corporation, Irvington, N.J., a corporation of New Jersey
Filed Aug. 20, 1957, Ser. No. 679,277
20 Claims. (Cl. 166—30)

This invention relates to novel compositions of matter, novel methods for preparing them and also to novel articles of manufacture which may be produced therewith. In one of its more specific aspects the invention is directed to novel methods for treating bore hole walls as well as other earth structures and to novel structures produced thereby.

One of the more specific aspects of the invention is directed to the art of sealing, plugging and/or consolidating earth such as rock, sand, soil or other type of earth formation, sometimes for the specific purpose of preventing or at least reducing the flow of liquid therethrough and to render them substantially impervious or at least less pervious to the flow of liquid therethrough. In one of its other more specific aspects the invention is directed to improved methods for plugging, sealing, grouting, impregnating or otherwise consolidating masses or bodies of sand, soil, rock or other earth formations which may be in a mineral formation or naturally occuring formation such as in the plugging or sealing of oil wells, gas wells, mines, shafts or other subsurface borings and tunnels.

In addition to the treatment of naturally occuring formations, the compositions of matter of this invention are readily adaptable to a variety of other uses which will be hereinafter described and may be used with or without other components.

In one of its more specific aspects, the practice of the present invention is particularly applicable in the oil well and gas well fields where the problem of stopping the flow of unwanted fluids can occur at various depths varying from short distances below the ground level to depths of 20,000 ft. or more. In this considerable range of depths, a corresponding range of temperatures also occurs, e.g., from atmospheric temperatures to 350° F. and higher. This range of temperature imposes a problem when it is desired to seal certain earth openings and also permeable strata at various distances from the earth surface with solidifiable materials whose rate of solidification is effected by the temperature encountered. The applicability of the methods and combinations of the present invention to the above stated problems will hereinafter appear in the following detailed description which is given merely by way of illustration and not by way of limitation.

In some cases the standard procedure for completing or sealing a well is to pump a Portland cement slurry down the inside of the steel pipe which serves as the well casing, around the bottom, and up the outside of the casing to serve as a filling between the outside of the casing and the wall of the bore hole. When the slurry reaches the desired height around the outside of the casing, the bottom becomes closed off and the cement at the bottom and around the outside of the casing is allowed to set to form a tubular inner lining between the bore hole wall and the steel casing and a plug at the bottom of the casing, leaving the rest of the casing free for use. If necessary, the cement plug at the bottom can be drilled to reach further depths or openings can be made through the sides of the casing and the cement inner lining by shooting operations well known and commonly used in oil field operations.

In some cases the steel casing is not centered in the bore hole but lies close to or even against one side of the bore hole wall so that the Portland cement is either thin or entirely absent at such points. In either case, flow of unwanted fluids from one stratum to another higher or lower stratum which carries desired fluids such as oil or gas can occur and it then becomes necessary to block off the unwanted fluid. Sometimes this blocking off is done after the well is completed and setting material such as Portland cement is used, but due to the fact that a Portland cement or similar solid slurry will not permeate into rock or soil strata or for some other reason, it has been found necessary to supplement the slurry with a water soluble resin which sets in place. The Portland cement serves as a filtering body by packing up against the bore hole wall and permitting the water of the slurry under the pressures used to pass through and into the bore hole wall carrying the water soluble resin with it as a squeeze-out. After a certain amount of the water soluble resin has been forced into the bore hole wall it is sealed off and left to stand under pressure until it sets in place.

Prior to the present invention, we proposed the use of certain compositions in the art of oil well sealing. Indeed, our proposal was accepted in the art and was directed to compositions (I) comprising water-soluble ketone-aldehyde reaction products, hydraulic cement and water for the aforesaid purposes. (By the term "water-soluble" as employed throughout the description and claims, we mean capable of forming solution with an equal volume of water.) This was a marked departure from the prior art practices and represented a very significant advance in the art for the reasons, among others, that the ketone-aldehyde reaction products are stable and consequently are substantially unaffected by the temperatures encountered under normal storage or transportation conditions and therefore no refrigeration is required at any time. Therefore, such reaction products are suitable for all practical handling and transportation conditions generally encountered no matter what the locale of use may be. Besides having the aforesaid very significant advantages, ketone-aldehyde reaction products also have the advantage of being so reasonably priced as to be economically feasible for use as a component of a hydraulic cement slurry which may be employed for the aforesaid purposes. In addition, such stable ketone-aldehyde reaction products themselves were found to be useful alone for sealing porous earth strata. It was found that they could be converted to the substantially solid and water resistant or insoluble state by the addition of an appropriate catalyst, such as lime. By the term "lime" as employed in the present description and claims, we mean calcium hydroxide usually found and sold on the market as hydrated lime or slaked lime.

Besides being stable, water soluble and economically sound, the ketone-aldehyde organic reaction products preferably employed have the following additional characteristic: When a 100-gram aqueous solution consisting of 80 grams of such ketone-aldehyde reaction product and 20 grams of water are mixed with 10 grams of lime and such mixture is placed in an oven maintained at 130° F. and allowed to remain therein for 24 hours, at the end of that period, the resultant mass will be found to be substantially mineral oil- and water-resistant and substantially solid at 70° F. and substantially infusible at 300° F.

Such compositions (I) containing hydraulic cement, water and such ketone-aldehyde reaction products are useful in the art of concrete, facing materials, plugging and sealing earth formations with or without the use of pressure and in some cases, where pressure is employed, the ketone-aldehyde reaction product component together with some of the water of such combination is forced or squeezed out of the admixture into such earth formation and thereafter the squeeze-out containing ketone-aldehyde reaction product became cured within the formation thereby forming a sheath around the cement which also was cured and contained some proportion of ketone-aldehyde reaction product originally present in the combination before application of pressure. Thus, in some instances, depending upon the pressure employed and the type of earth formation, two layers are formed, the outer layer being essentially the squeeze-out ketone-aldehyde-rich portion and the inner layer being a hydraulic cement-rich portion both of which become converted to the substantially solid and substantially water-insoluble state.

We also proposed the production and use of a solution or slurry, generally aqueous and alkaline for the aforesaid purposes of treating an earth bore hole wall to plug, seal or consolidate the earth formation of such a wall, and also proposed that instead of employing an aqueous alkaline slurry of such reaction products, that there be employed an aqueous alkaline slurry containing such ketone-aldehyde reaction product and one or a combination of two or more inorganic materials such as bentonite, barium, calcium or other alkaline clays, cementitious material, hydraulic cement, such as gypsum cement (plaster of Paris) and the like. Of these, the preferable hydraulic cements proposed for such slurries were one or a combination of two or more of the hydraulic cements, such as Portland cement and aluminous cements produced by the sintering of lime-alumina-silica systems and containing di- and tri-calcium silicates and mono- and tri-calcium aluminates, and pozzolan cements.

These said reaction products may be of various consistencies varying from thin liquids to very thick, heavy bodied masses at atmospheric pressure and room temperature (70° F.) and may be produced by reactiong one or a combination of two or more ketones, with one or a combination of two or more aldehydes, and preferably formaldehyde alone or in combination with one or more other aldehydes, such as acetaldehyde, paraldehyde, furfural, acrylic aldehyde, etc., in the presence of a catalyst. Besides such reaction products, the term "ketone-aldehyde organic reaction product," unless otherwise qualified, as employed in the description and claims, is also meant to include a combination of a ketone-aldehyde reaction product together with another ketone-aldehyde reaction product, or a ketone-aldehyde reaction product reacted with another ketone and/or aldehyde.

Such ketone-aldehyde organic reaction product preferably employed in the production of compositions (I) are acetone-formaldehyde organic reaction products produced by reacting acetone and formaldehyde; or such acetone-formaldehyde reaction products in combination with one or more organic reaction products of formaldehyde and one or more other ketones; or (mixed ketones)-formaldehyde reaction products in which at least one of said ketones is acetone, produced by reacting formaldehyde with acetone and one or a combination of two or more other ketones. The other ketones preferably employed are those which have 3 hydrogen atoms on an alpha carbon, such as methyl ethyl ketone, methyl propyl ketone, diacetone alcohol, mesityl oxide, acetonyl acetone, ethyl ester of aceto acetic acid, etc. In this last reaction, we believe that there is produced a reaction mass containing a number of different reaction products, namely, acetone-formaldehyde, other ketone-formaldehyde and (acetone and other ketones)-formaldehyde reaction products; and that reaction masses containing such three reaction products may be produced by reacting a ketone-formaldehyde reaction product with another ketone or by reacting another ketone-aldhyde reaction product with acetone. By the term "formaldehyde," we mean to include formaldehyde as well as its equivalents, such as paraformaldehyde, trioxane, etc., as well as formaldehyde donors, such as hexamethylene tetramine, etc.

The employment of such ketone-aldehyde reaction product as a component in a combination containing hydraulic cement and water represents a marked departure from the prior art and especially in the art of treating earth bore hole walls. Such marked departure represented a vey significant advance in the art for the reasons that such ketone-aldehyde reaction products are stable and are substantially unaffected by the temperatures encountered under normal storage and transportation conditions encountered in the field. In addition, such ketone-aldehyde reaction products have the advantage of being so reasonably priced as to be economically feasible for use in combination with water and hydraulic cement. Moreover, such ketone-aldehyde organic reaction products have the still further advantage that when a slurry containing hydraulic cement, water and such ketone-aldehyde organic reaction product is forced against an earth bore wall by pressure, there is some separation therefrom of a solution of said ketone-aldehyde reaction product which impregnates said wall and while maintained under pressure at the temperatures encountered, the ketone-aldehyde reaction product is converted to the substantially solid state and is in the nature of a gel and contains water.

In most cases, such preferred ketone-aldehyde reaction products which are preferably employed in the production of compositions (I) are those which are soluble in an equal volume of water, and especially those which at 70° F. exhibit flow and therefore are liquid and also are liquid at 130° F. When in an aqueous solution of 4 parts by weight of said reaction product to 1 part by weight of water, said solution will have a viscosity at 25° C. in the range of 200–50,000 centipoises. When a 100-gram sample of such aqueous solution of any of said reaction products are mixed with 10 grams of lime and allowed to remain for 24 hours in an oven whose temperature is 130° F. at the end of that period the resultant mass will be found to be in the substantially solid state at room temperature and will remain in that state at elevated temperature of at least 300° F. and is also substantially water-insoluble.

A solution or slurry, generally aqueous and alkaline, may be employed for the aforesaid purpose of treating an earth bore hole wall to plug, seal or consolidate the earth formation of such a wall.

The various acetone-formaldehyde reaction products may be produced by reacting acetone and formaldehyde under varying conditions. Generally they are produced by reacting a mixture of acetone and formaldehyde to which has been added an alkaline catalyst. The molecular proportions of the acetone and formaldehyde which are reacted in the mixture are preferably 1 mole of acetone to at least 2 and preferably 3–5 moles of formaldehyde and an example of the catalyst employed is sodium hydroxide or any of its equivalents such as potassium hydroxide, calcium hydroxide, potassium carbonate, sodium carbonate, etc. These strongly alkaline catalysts are of such a nature that when added to such mixtures of acetone and formaldehyde they are capable of providing an exothermic reaction between the acetone and formaldehyde after the reaction has been initiated with the aid of external heat.

By employing the procedure set forth in Examples A–D hereinafter set forth and controlling the quantity of alkaline catalyst or agent employed, there may be produced acetone-formaldehyde reaction products which are normally liquid, soluble in an equal volume of water, with high yields of such water soluble reaction products, said yields being at least 75% by weight of the combined weights of the acetone and formaldehyde in the original charge.

When the mole ratio of the acetone to the formaldehyde in the charge is one to three, the quantity by weight of sodium hydroxide employed is less than 4%, generally 1%–3% and preferably approximately 2% of the combined weights of acetone and formaldehyde in the charge; when the mole ratio of the acetone to the formaldehyde in the charge is one to four, the quantity by weight of sodium hydroxide employed is less than 5%, generally 1.5–4% and preferably approximately 2.5% of the combined weights of acetone and formaldehyde in said charge; when the mole ratio of acetone to formaldehyde in the charge is one to five, the quantity by weight of sodium hydroxide employed is less than 7.75%, generally 2–6% and preferably approximately 4% of the combined weights of acetone and formaldehyde in said charge. Of course, instead of employing sodium hydroxide, the alkaline equivalent of any other strongly alkaline reagent may be used.

The sodium hydroxide or other alkaline reagent is preferably first dissolved in a solvent such as water and the alkaline reagent is added to the charge as a solution. For best results, the solution of alkaline reagent should not be added all at one time. It may be added in increments the amounts of which are dictated or controlled by the speed of reaction desired. After the entire charge of acetone and formaldehyde is contained in the reaction vessel, the aqueous solution generally 50% concentration of the sodium hydroxide or other alkaline reagent is made up in a separate container, with the amount of reagent dependent upon the mole ratio of acetone to formaldehyde in the charge. The aqueous alkaline solution is divided into three or four equal parts. One part is then added to the acetone and formaldehyde charge which is constantly stirred throughout the entire process. After this addition the mass is externally heated to a temperature of about 120–130° F. to initiate the reaction. The heat is shut off and the mass now reacts exothermically and its temperature rises and by the use of cooling water in the jacket of the reaction vessel its temperature is allowed to rise to approximately 200° F. Then its temperature goes down to approximately 175° F. whereupon the second quarter of the alkaline solution is added. Again the temperature rises and is allowed to rise to approximately 200° F. and falls to approximately 175° F. The third quarter of the alkaline solution is added and again the temperature rises and is allowed to rise to approximately 200° F. and falls to approximately 175° F. The last quarter of the alkaline solution is added and again the temperature rises and is allowed to rise to approximately 200° F. and then falls to approximately 140° F. whereupon the cooling water is shut off. Then the mass may be maintained in the state of boiling under a reflux condenser for ½ hour to 1 hour, if desired, and then allowed to cool to approximately 140° F. Either with or without the boiling under reflux, vacuum is now gradually applied in the reaction vessel to remove some of the water, and to cause cooling of the mass until the temperature of the mass is lowered to approximately 105–110° F. At this stage a 28–29″ vacuum is applied and dehydration is continued until a solution of the desired percentage of solids is obtained or until the resin is substantially anhydrous. In either case the reaction product of a resinous nature produced is liquid, water soluble in an equal volume of water and thermosetting under alkaline conditions and measures at least 75% of the combined weights of the acetone and formaldehyde in the original charge. Said reaction product is also characterized by being stable for months at temperature of 30° C. Said reaction product besides having such good stability characteristics especially when dehydrated to an aqueous solution of 60–85% concentration also has the characteristics of having excellent pumping qualities in aqueous solution and also when in an aqueous slurry of hydraulic cement, has very high bonding strength when converted to the solid state, has good antifriable characteristics when converted to the solid state, has good squeezability characteristics when in an aqueous slurry of hydraulic cement whereby it may be squeezed out therefrom when subjected to pressure which may vary and be as high as and run higher than 10,000 lbs. per sq. in.

The following are examples of methods for producing acetone-formaldehyde reaction products which may be used in the production of compositions (I) and are given merely by way of illustration and not in a limiting sense, all parts being given by weight unless otherwise specified.

*Example A*

(1 mole acetone—4 moles formaldehyde)

300 lbs. acetone
1700 lbs. aqueous solution formaldehyde (37% conc.)
25 lbs. NaOH in
60 lbs. water The caustic soda-water solution was divided into four equal parts. All of the acetone and formaldehyde were loaded into a jacketed reaction vessel provided with appropriate stirring equipment. With the stirring equipment in operation and with steam turned on through the jacket, the acetone and formaldehyde mixture was heated to a temperature of about 120–125° F. whereupon the steam was cut off and one portion of the caustic soda-water solution was added thereto. Upon the addition of the caustic soda solution to the mixture, the reaction is initiated and proceeds exothermically whereupon the temperature of the mass being agitated begins to rise and when it reaches approximately 130° F. the cold water is turned on and controlled so that the exothermic reaction proceeds and the temperature slowly rises to approximately 200° F., and then slowly begins to fall. When it falls to approximately 185° F., the second portion of the caustic soda water solution is added whereupon the temperature of the mass again rises and is controlled by the cooling water whereupon it is allowed to rise slowly again to approximately 200° F. Again the temperature begins to fall and when it reaches approximately 185° F. the procedure is repeated allowing the temperature slowly to rise and fall as before between the additions of the caustic soda-water solution while keeping the cold water on the jacket at all times. After the last addition of caustic soda-water solution the temperature of the mass was allowed to rise to approximately 200° F. Then it is allowed to fall to approximately 140–150° F. at which stage the cold water is shut off. During this entire operation the vent at the top of the reacting vessel was maintained open and while still open the vacuum is turned on at this stage. The vent is now slowly closed, while vacuum is maintained and dehydration occurs at a very rapid rate, and temperature of the mass begins to drop. Steam is admitted to the jacket to allow dehydration to progress rapidly. In this manner vacuum is applied and maintained in the reaction vessel and dehydration proceeds and may be continued to provide the desired concentration of the acetone-formaldehyde reaction product therein. This dehydration may be continued until the concentration of the acetone-formaldehyde reaction product is 60–100% and preferably 60–85%. The amount of said reaction product produced according to this method measures more than 75% of the combined weights of the acetone and formaldehyde in the original charge. Said acetone-formaldehyde reaction product is of a resinous nature, is liquid, is hereinafter known as product A, is amber colored, and is soluble in an equal volume of water. An 80% aqueous solution of product A has a viscosity of 732.6 cp. at 25° C. and atmospheric pressure.

*Example B*

(1 mole acetone—3 moles formaldehyde)

30 parts of acetone
126 parts aqueous solution of formaldehyde (37% conc.)
2 parts NaOH in
4 parts water Using the same procedure as that set forth in Example A, the resultant acetone-formaldehyde reaction product, hereinafter known as product B, was likewise amber-colored, liquid and measured more than 75% of the combined weights of acetone and formaldehyde in the original charge. Product B was soluble in an equal volume of water.

Example C (1 mole acetone—5 moles formaldehyde)

30 parts acetone
212 parts aqueous solution formaldehyde (37% conc.)
4 parts NaOH in
8 parts water Employing the same procedure as that set forth in Example A, except that after the last addition of caustic soda-water solution and subsequent drop in temperature following the last exothermic reaction, the entire mass is heated to boiling under a reflux condenser for approximately 15 minutes. The quantity of free formaldehyde in the mass is determined and found to be 5.2% of the amount of formaldehyde in the original charge. Upon dehydration at 210° F. in the manner heretofore indicated, the resultant substantially anhydrous resin known as product C was an amber colored, viscous mass, infinitely soluble in water and measuring more than 75% of the combined weight of acetone and formaldehyde in the original charge.

Example D (1 mole acetone—4.5 moles formaldehyde)

165 lbs. acetone
1050 lbs. aqueous solution of formaldehyde (37% conc.)
13.5 lbs. NaOH in
27.5 lbs. water Employing the same procedure as that set forth in Example A, there is produced an 80% aqueous solution of product D which is essentially an acetone-formaldehyde reaction product of a resinous nature, normally liquid, of amber color and soluble in an equal volume of water. Such 80% aqueous solution of product D is stable for 6 months at 30° C.

Example E

If desired, the acetone-formaldehyde reaction products such as products A, B, C and D may be treated or polymerized to increase their viscosity by merely heating or they may be subjected to the treatment hereinafter set forth in this example for the dual purpose of increasing their viscosity and decreasing the content of free formaldehyde present. For effecting said dual purpose the following procedure is followed: In each of the aforesaid Examples A–D, the dehydration step therein is terminated when the acetone-formaldehyde organic reaction product in aqueous solution measures about 65–85%. Then said aqueous solution of said partially dehydrated acetone-formaldehyde reaction product is placed in a reacting vessel and there is added thereto an aqueous solution of an alkali and preferably a mild alkali such as sodium sulphite, sodium acetate, potassium sulphite or equivalent compound to increase the pH of the mix. The mix is heated slowly to a temperature of about 250° F. and is maintained until the viscosity of 4 parts of the resin therein when dissolved in 1 part of water measures 2,000–50,000 cp. at 25° C. This provides a simple, easily controllable method which is eminently suitable in factory practice for thickening or increasing the viscosity of the acetone-formaldehyde resin to the desired degree, and practically eliminating the danger of the resin going to the infusible state. More specifically, for example, 250 lbs. of an 80% solution of said acetone-formaldehyde resin, after the partial dehydration step, is now mixed with an aqueous solution consisting of approximately 7 lbs. of sodium sulphite dissolved in a small amount of water. The mixture is heated to approximately 250° F. and maintained at that temperature until a sample of 4 parts of the resin when dissolved in one part of water is in the aforementioned viscosity range. When this viscosity is reached, the heat is cut off and enough water is added to the resin to provide a solution which measures 4 parts of resin to each part of water present. This batch which is an aqueous solution of said resin will be within the viscosity range heretofore set forth. Such acetone-formaldehyde organic reaction products so produced from products A, B, C and D are hereinafter respectively known as products E, F, G and H and all of them are capable of flow at 130° F. and are soluble in water.

An organic catalyst, such as an amine, may be employed with or without the aid of an inorganic catalyst as shown by the following illustrative examples. Throughout this entire description and claims all parts are by weight unless otherwise specified.

Example I 1700 parts of aqueous solution formaldehyde (37% conc.)
600 parts of acetone
25 parts of triethylamine All of said components are mixed together and warmed gently to accelerate the exothermic reaction which ensues and is allowed to continue under a reflux condenser after the external source of heat has been removed. When exothermic reaction subsides, external heat is again applied to maintain the mass in the state of boiling under the condenser for ½ hour. The condenser is then removed and the mass is heated to about 130° C. to dehydrate. The resultant substantially anhydrous acetone-formaldehyde liquid reaction product is of a resinous nature, is straw colored and is hereinafter known as product I and measured about 950 parts containing 0.75% nitrogen.

Example J

Employ the same components in the respective amounts set forth in Example I and employ the procedure as therein set forth except that the acid number of the formaldehyde solution has first been ascertained, then sufficient sodium carbonate is added thereto to reduce the acid number thereof to zero. The resultant substantially anhydrous acetone-formaldehyde liquid reaction product is of a resinous nature, is straw colored and is hereinafter known as product J and measured about 950 parts.

Example K

To 1700 parts of aqueous solution of formaldehyde (37%) is added a solution of 315 parts of acetone together with 25 parts of triethylamine. Under reflux condenser the mass is warmed gently to accelerate the exothermic reaction. After the exothermic reaction has subsided, a solution of 315 parts of acetone together with 25 parts of triethylamine is added thereto. By the use of external heat the mass is maintained in the state of boiling under said condenser for 30 minutes. Then the mass is heated to about 130° C. to substantially completely dehydrate it. The yield is 973 parts of substantially anhydrous liquid acetone-formaldehyde reaction product which is of a resinous nature, straw colored and is hereinafter known as product K.

Example L 510 parts aqueous solution formaldehyde (37% conc.)
360 parts acetone
75 parts diethylamine propyl amine The above components were mixed and placed under a reflux condenser and allowed to stand at room temperature (70° F.), whereupon an exothermic reaction occurred and the temperature of the mass reached 76° C. The mass was allowed to react for about 1½ hours, the condenser removed and then the mass was maintained under reduced pressure of 70 mm. of mercury pressure, at a temperature of 95° C. until it was substantially completely dehydrated. This yielded 342 parts of substantially anhydrous liquid acetone-formaldehyde reaction product which was of a resinous nature, was straw colored and is hereinafter known as product L.

Example M 510 parts aqueous solution formaldehyde (37% conc.)
180 parts of acetone
75 parts of diethylamine propyl amine Employing the same procedure as set forth in Example L, there was obtained a yield of 325 parts of substantially anhydrous liquid acetone-formaldehyde reaction product which is of a resinous nature, is straw colored and is hereinafter known as product M.

Example N 170 parts aqueous solution of formaldehyde (37% conc.)
60 parts acetone
0.5 part of diethylamine propyl amine The above components were mixed and placed under a reflux condenser. The pH of the mix was determined and found to be about 9. The mix was heated gently to accelerate the speed of the exothermic reaction. When the exothermic reaction had subsided, the mass was maintained in the state of boiling for ½ hour. Then the condenser was removed and the mass dehydrated under vacuum at about 70 mm. of mercury pressure and a temperature of about 90–95° C. to obtain a liquid substantially anhydrous acetone-formaldehyde reaction product which was of a resinous nature and straw colored and is hereinafter known as product N.

Example O—Q

Using the same first two components of Example N in the same amounts as therein set forth and also the third component, except that the third component is present in the following respective amounts: 1 part in one case, 6 parts in another and 26 parts in the third and using the method set forth in Example N, there is obtained liquid substantially anhydrous acetone-formaldehyde reaction products all of which are of a resinous nature, straw colored and are hereinafter respectively known as product O, P and Q. The pH of products O, P and Q were determined and found to be respectively 8.5, 9.5 and 10.5. Such determinations were made on aqueous solutions of said respective products dissolved in 4 times their weight of water.

Employing the particular three components of Examples 1-6 herebelow, in each instance such respective three-component mixtures are gently heated and continuously stirred whereupon reaction between the ketone and aldehyde is initiated and continued only so long as the resultant reaction product is water soluble and is terminated at the first observation of any cloudiness. Said entire masses are respectively charged into equal volumes of 80% aqueous solutions of product I, to provide products R, S, T, U, V and W.

Example 1

255 parts of aqueous solution of formaldehyde (37% conc.)
110 parts of diacetone alcohol
5 parts of diethyl amine propyl amine

Example 2

170 parts of aqueous solution of formaldehyde (37%)
60 parts of mesityl oxide
5 parts of diethylamine propyl amine

Example 3

340 parts of aqueous solution of formaldehyde (37%)
72 parts of methyl ethyl ketone
35 parts of diethylamine propyl amine

Example 4

170 parts aqueous solution of formaldehyde (37% conc.)
60 parts of acetonyl acetone
26 parts of diethylamine propyl amine

Example 5

255 parts of aqueous solution of formaldehyde (37% conc.)
130 parts of ethyl ester of aceto acetic acid
25 parts of diethyl amine propyl amine

Example 6

170 parts of aqueous solution of formaldehyde (37% conc.)
60 parts of isophorone
25 parts of diethyl amino propyl amine

Example X 170 parts of aqueous solution of formaldehyde (37% conc.)
60 parts of acetone
1 part of triethylamine The components are charged into a stainless steel autoclave and heated to raise the pressure therein to 100 lbs. per sq. in. and the mass was so maintained for 1 hour. The source of heat was removed and then the mass was dehydrated at 96% C. under 40 mm. of mercury pressure to obtain a yield of 82 parts of anhydrous liquid acetone-formaldehyde reaction product of a resinous nature, which is stable and water soluble and is known hereinafter as product X.

Instead of using a closed vessel, such as the autoclave, the reaction may be carried out at atmospheric pressure under a reflux condenser and maintained in the state of boiling for about ½ hour and the substantially anhydrous reaction product obtained is liquid, water soluble and resinous and measures 95 parts and is hereinafter known as product Y.

All of said ketone-formaldehyde reaction products, in which amine is the catalyst employed, are alkaline, that is, the pH of the water solution thereof is at least 7.2. A sample of reaction product I, for example, is strongly alkaline and has been stable for more than 2 months.

Example Z 170 parts aqueous solution of formaldehyde (37% conc.)
30 parts acetone
25 parts triethylamine Employing the same procedure as that set forth in Example I there is obtained a substantially anhydrous acetone-formaldehyde liquid reaction product which is of a resinous nature and is hereinafter known as product Z and measures about 95 parts.

Example AA 85 parts aqueous solution of formaldehyde (37% conc.)
30 parts paraformaldehyde
60 parts acetone
25 parts triethylamine The four components are mixed together under a reflux condenser and warmed gently to increase the speed of the exothermic reaction which proceeds and the temperature of the mass goes to about 165° F. After it has subsided, the mass is maintained in the state of boiling under the reflux condenser for about 1 hour. The condenser is removed and the mass is heated to about 130° C. to dehydrate and the resultant product is a substantially anhydrous liquid reaction product, hereinafter known as product AA and weighing about 85 parts.

Example BB 60 parts acetone
340 parts aqueous solution of formaldehyde (37% conc.)
1.2 parts potassium carbonate dissolved in
2.5 parts water were charged into a reacting unit having a reflux condenser and mixed together. External heat was applied until the temperature of the mass reached 145° F. External heat was removed because the exothermic reaction started and continued. The temperature rose to 165° F. The reaction was allowed to continue for 15 minutes and the temperature began to drop. The mass was cooled to about 140° F. and at this stage 60 parts of acetone and 5 parts of triethyl amine are added. Heat was applied to maintain the mass in the state of boiling under the condenser for ½ hour. The condenser was removed and the mass maintained at 225° F. to partially dehydrate and provide an 80% aqueous solution of the acetone-formaldehyde reaction product hereinafter known as product BB. The viscosity of said solution at 25° C. was 2440 cps., the specific gravity 1.205 at 25° C. and the index of refraction 1.4857 at 25° C.

*Example CC*

340 parts of aqueous solution formaldehyde (37% conc.)
60 parts of acetone
2 parts of diethyl amino propyl amine were charged into a reacting vessel having a reflux condenser. The mass was stirred and external heat applied to hasten the exothermic reaction. The temperature rose to 175° F. and remained at that temperature for about 15 minutes. Then the mass was cooled to 140° F. and 60 parts of acetone and 12 parts of diethyl amino propyl amine were added. Again an exothermic reaction set in and the temperature rose to 165° F. At this stage, external heat was applied and the mass was maintained in the state of boiling for ½ hour. The condenser was removed and the mass was maintained at 225° F. to dehydrate to provide an 80% aqueous solution of resinous acetone-formaldehyde reaction product known hereinafter as product CC which solution at 25° C. had the following characteristics: Viscosity, 1670 cp. Specific gravity, 1,215; and Index of Refraction, 1,4818.

*Example DD*

1700 parts aqueous solution of formaldehyde (37% conc.)
315 parts of acetone were mixed together and then there were added thereto:
12.5 parts of triethylamine The reaction was allowed to take place and cooling provided so that the exothermic reaction was not too vigorous. When the exothermic reaction had subsided, a charge of 315 parts of acetone
12.5 parts of triethylamine was added to said mass with stirring and a second exothermic reaction was allowed to take place. Then after this reaction had subsided the mass was refluxed for 1½ hours, then dehydrated at elevated temperature to provide Product DD.

*Example EE*

170 parts aqueous solution of formaldehyde (37% conc.)
60 parts of acetone
3 parts of diethylamino propyl amine Employing the same procedure as that set forth in Example N, there was provided substantially anhydrous acetone-formaldehyde reaction product hereinafter known as product EE.

*Example FF*

170 parts of aqueous solution of formaldehyde (37% conc.)
60 parts of acetone
7.5 parts of diethyl amino propyl amine Employing the same procedure as that set forth in Example N, there was provided substantially anhydrous acetone-formaldehyde reaction product hereinafter known as product FF.

Employing in the following Examples GG—JJ the same procedure as the set forth in Example A, except that instead of acetone being the only ketone employed, a mixture of acetone and one or more other ketones are used, and the components are used in the following proportions to provide Products GG—JJ respectively:

*Example GG*

50 parts of acetone
25 parts of methyl ethyl ketone
425 parts of aqueous solution formaldehyde (37% conc.)
6 parts of NaOH in
12 parts of water providing a solution consisting of 80 parts of resinous reaction product, hereinafter known as product GG, in 20 parts of water.

*Example HH*

37.5 parts acetone
37.5 parts of methyl ethyl ketone
425 parts aqueous solution of formaldehyde (37% conc.)
6 parts NaOH in
12 parts water to provide a solution consisting of 80 parts of resinous reaction product, hereinafter known as product HH, in 20 parts of water.

*Example II*

25 parts acetone
50 parts methyl ethyl ketone
425 parts aqueous solution formaldehyde (37% conc.)
6 parts NaOH in
12 parts of water to provide a solution consisting of 80 parts of resinous reaction product, hereinafter known as product II, in 20 parts of water.

*Example JJ*

65 parts acetone
10 parts methyl ethyl ketone
425 parts aqueous solution formaldehyde (37% conc.)
6 parts NaOH in
12 parts water to provide a solution consisting of 80 parts of resinous reaction product, hereinafter known as product JJ, in 20 parts of water.

*Example KK*

Employing the same procedure and components as those set forth in Example A, except that for the 1700 lbs. of aqueous formaldehyde employed therein, there is employed a combination consisting of 1275 lbs. of such aqueous solution of formaldehyde together with 220 lbs. of acetaldehyde to provide a water soluble organic reaction product hereinafter known as product KK.

*Example LL*

Employing the same procedure and components as those set forth in Example B, except that for the 126 parts aqueous solution of formaldehyde employed therein, there is employed a combination consisting of 170 parts of such aqueous solution of formaldehyde and 29 parts of propionic aldehyde to provide a water soluble organic reaction product hereinafter known as product LL.

All of said ketone-aldehyde reaction products, specific illustrative examples of which are products A—LL respectively are water soluble and are further characterized as follows: When a 100-gram solution consisting of 80-gram sample thereof in 20 grams of water is mixed with 10 grams of lime and the mixture is placed in an oven at 130° F. and allowed to remain therein for 24 hours, at the end of that period the mass will be substantially solid resinous product infusible at 300° F. and is substantially water-insoluble.

It is well known that the temperature of the various strata of bore hole walls of oil and gas wells vary considerably depending upon the particular distance each is located from the surface of the earth and that the further from such surface, the greater is the temperature thereof. Because the earth formations to be consolidated or sealed are located at various distances from the earth surface and therefore are at different temperatures, both of these factors, namely, distance and temperature must be considered. According to this invention, there is provided a novel way for controlling the pumping time of compositions (I) and at the same time providing novel combinations with compositions (I), which combinations are superior to compositions (I) themselves, and which combinations, when under pressure, are capable of providing squeeze-outs which are superior to squeeze-outs of compositions (I). We have discovered that by adding hereinafter fully identified compositions (I) certain hardening or modifying agents (A) hereinafter fully identified, we may control the pumping time of and also impart to such compositions (I) and squeeze-outs thereof, novel unexpected and improved characteristics.

For a fuller understanding of the nature and objects of this invention, reference should be had to the following detailed description taken in connection with the accompanying drawings, in which.

Figure 1:
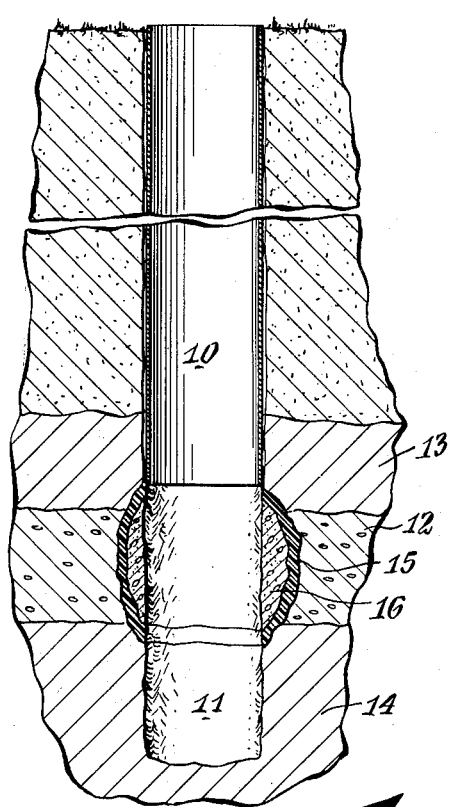
FIG. 1 is a shortened vertical view partly in section and partly in side elevation showing a bore hole wall embodying the invention.

In the practice of this invention, it is possible to produce with compositions (I) novel compositions of matter finding application as sealants for earth formations located over a wide range of depths in such bore holes. This is accomplished by adding to said compositions (I), one or a combination of two or more polyamino compounds hereinafter more fully defined and herein known as hardening agent (A). By choosing a particular hardening agent (A) or combination of hardening agents (A) in particular proportions added to compositions (I) various novel compositions of matter may be provided so that each of such combinations is (1) capable of passing through particular temperature zones in said bore holes and still be in pumpable condition at least until it reaches the particular area to be sealed and (2) is in such condition at that stage that when maintained under certain pressure, a water-containing hardening agent (A) and ketone-aldehyde organic reaction product-rich portion may be squeezed out of the combination into the earth formation to be consolidated and leaving a water and hydraulic cement-rich layer containing some ketone-aldehyde reaction product and hardening agent (A) mass adjacent thereto. Such ketone-aldehyde rich squeeze-out as well as the hydraulic cement-rich layer and also, if present, the compositions of matter per se will become converted to the substantially solid and substantially mineral oil and water resistant or insoluble state when maintained at the locale to be sealed under such pressure and temperature there encountered within a period of 24 hours. The hardening agent (A), an essential component in the practice of this invention, is one or a combination of two or more polyamino compounds, each of said polyamino compounds being characterized as follows: (1) is a carbon and nitrogen containing compound containing at least 2 of any or at least any two of the following groups: $-NH_2$, $-NH$, $$-\overset{|}{N}-$$

that is each polyamino compound has at least two of either a primary amino nitrogen containing group ($-NH_2$), a secondary amino nitrogen containing group ($-NH$) or a tertiary amino nitrogen containing group $$(-\overset{|}{N}-)$$

or a combination of two or more of them; (2) is capable of reacting with said ketone-aldehyde organic reaction products to provide substantially solid organic reaction products which are oil and water resistant; (3) is capable of solution in an aqueous solution of said ketone-aldehyde organic reaction products employed and in such system, which may or may not include a modifier, such as a retarder or accelerator, is capable of reaction with said ketone-aldehyde reaction products in the presence of water to produce a substantially homogeneous, water-containing solid mass, resistant to water and oil; (4) when a mixture consisting of 94 grams (1-gram mole) of hydroxybenzene and a number of grams of said polyamino compound equal to its molecular weight, divided by the number of amino groups therein is heated to 150° C. and maintained at that temperature for 4 hours, at the end of that period the resultant mass is liquid at 150° C.; (5) when 1 mole of said polyamino compound and 2 moles of aqueous formaldehyde (37% conc.) are heated to 90° C. and maintained at that temperature for a period of about 10 minutes, at the end of that period the mass is water-soluble. Specific examples of some of said polyamino compounds are hereinafter set forth. Due to the presence of said hardening agent (A) therein, the squeeze-out converted into the substantially solid and mineral oil and water resistant or insoluble state is harder, tougher, denser, more resistant to leaching by the earth's fluids and is more permanent than would be the ketone-aldehyde rich squeeze-out of composition (I) per se be in the absence of such hardening agent (A). Such novel squeeze-outs from such combinations are capable of being converted to the substantially solid state within pre-determined periods of time at certain temperatures. Consequently, the presence of such hardening agents decreases the time necessary for converting the squeeze-outs to the substantially solid and water resistant or insoluble state at certain pre-determined temperatures. Due to the presence of said hardening agents in the squeeze-outs from said novel combinations, said squeeze-outs when converted to the substantially solid and substantially water-insoluble or resistant state at the temperature of the strata to be consolidated or sealed are, a water-containing substantially uniform mass which is a gel or in the nature of a gel and is of a somewhat tough "rubbery" nature and is resilient and capable of withstanding shock, and also has the characteristics of good compression strength, impact and shock resistance which are important attributes in the oil and gas well fields where a sealant is to be subjected to sudden shocks, impacts, etc. many times encountered as a result of pumping vibrations, casing perforation or other operation performed in the course of completion operation.

For example, by practising this invention, it is possible to provide a combination having an acceptable pumping time where the earth formation to be consolidated or sealed is only a few hundred feet from the surface of the earth and the entire combination, as well as the squeeze-out thereof, if any, will both be converted to the substantially solid and substantially water insoluble or resistant state within 24 hours at said location and also to provide another combination for example, having an acceptable pumping time where the earth formation to be consolidated or sealed is 5,000 ft. or more from the surface of the earth and the entire combination and squeeze-out, if any, will be converted to the substantially solid and substantially water resistant or insoluble state within 24 hours at that location and also to provide particular combinations each having an acceptable pumping time and having the foregoing characteristics of the combinations per se, as well as the squeeze-outs, if any, for sealing or consolidating earth formations at any depths, varying from the surface of the earth to 20,000 or more feet from the surface of the earth. In all cases, such combinations, as well as such squeeze-outs therefrom at the various depths of sealing or consolidating earth formations will be converted to the substantially solid and substantially water resistant or insoluble state within a 24-hour period and will have the improved characteristics as before set forth when compared with compositions (I) if employed in the absence of such hardening agents.

Said compositions (I) are produced by mixing together water, hydraulic cement and such ketone-aldehyde reaction products examples of which are said specific products A—LL, with the ratio by weight of the hydraulic cement to the ketone-aldehyde organic reaction product being 100 parts of the former to 10–100 parts of the latter and the amount of water is also variable depending upon the consistency desired in compositions (I). It is preferable in said compositions (I) that the ratio of hydraulic cement to such ketone-aldehyde reaction products be 100 parts of the former to 20–100 parts of the latter. Specific examples of such compositions (I) are described and illustrated in our copending applications Serial No. 350,982, filed April 24, 1953, and subsequently abandoned and Serial No. 658,883, filed May 13, 1957 and issued as U.S. Patent 2,828,820 on April 1, 1958.

Examples of such polyamino compounds, some of which are more effective than others, are ethylene diamine; phenylene diamine; propylene diamine; diethylamino propylamine; diethylene triamine; triethylene tetramine; dicyandiamide; 1,3,5-(dimethyl amino methane) phenol, known on the market as DMP-30; diamethyl amino propyl amine; isophthalyl dihydrazide; adipic acid dihydrazide; metaphenylene diamine; calcium cyanamide (when heated in the presence of water this compound hydrolyzes to provide calcium hydroxide and dicyandiamide as shown on page 278 of "Handbuch der Präparativen Chemie" 3te Auglage, 2 Organischer Teil (1937) by Vanino); toluene diisocyanate; diamino anisole; diamino anthraquinone; diamino azo benzene; diamino benzoic acid; diamino diphenyl amine; diphenyl ether; diphenyl methane; hydrazo benzene; diamino phenol; diamino phenyl acetic acid; p-chloro o-phenylene diamine; o-phenylene diamine; 4-isopropyl m-phenylene diamine; 2,4 toluene diamine; p,p' methylene dianiline; dibutyl amino propyl amine; diethyl amino propyl amine; 3,3' imino bis propyl amine; N-N bis 1 methyl, actyl p-phenylene diamine; piperazine; pyrimidine; prozines; pyrezines; imidazoles; oxoazoles; azo benzene; diamino chloro benzene; diamino toluene; diamino nitrobenzene; diamino sulfonic acid; p-amino dimethyl aniline; dialkylamino ethyl-, propyl-, and butyl-amine; amino pyridine; p-amino benzene sulfonylamide; triamino azo benzene (Bismarck Brown); triamino benzene; triamino benzoic acid; triamino chlorobenzene; triamino phenol; triamino toluene; triamino triphenyl methane; triamino sulfonic acid; triamino nitro benzene; guanidine; phenyl dicyandiamide; benzo guanidine; malonamide; succinamide; Congo Red; etc.

We have discovered that other agents may be employed in such combinations to accelerate or retard the reaction between hardening agent (A) and the ketone-aldehyde reaction product to serve as controlling agents for controlling the pumping time of the combination and also to control the setting time of the combination at the area to be sealed. Such agents for accelerating or retarding such reaction are agents (B) hereinafter described.

The proportion of such hardening agent (A) preferably employed in combination with composition (I) is such that for each 100 parts by weight of ketone-aldehyde organic reaction product in composition (I), there is present about 2–30 parts by weight of hardening agent (A). Hardening agent (A) preferably employed is soluble or dispersible in said system of composition (I) or in an 80% aqueous solution of ketone-aldehyde therein and in any case such a combination may be filtered to provide an aqueous filtrate containing at least some of the hardening agent (A) and also some of the ketone-aldehyde and calcium hydroxide leached out of or otherwise derived from composition (I).

Instead of combining all of the components of composition (I) with hardening agents (A), with or without agents (B), these various agents first may be reacted with each other and then combined with composition (I), or they may be reacted with the ketone-aldehyde organic reaction products, and then the resultant reaction products may be combined with the other components of composition (I).

We have discovered that by employing hardening agent (A) in combination with such composition (I), it is possible to control the pumping time and obtain squeeze-outs capable of setting within 24 hours. By choosing a particular hardening agent (A) which is a polyamino compound or combination of polyamino compounds, as well as the proportion of such hardening agent (A) in combination with composition (I), it is possible to provide individual combinations having particular pumping times and having the further characteristic that sealing may be accomplished within 24 hours at areas to be sealed where the temperature may be as low as 20° F. and as high as 200° F. and higher. Such novel combinations have the further advantage in that the squeeze-outs from such combinations which may have a viscosity as low as 10 poises or as high as 40 poises measured at the temperature of sealing, may be cured within 24 hours to the substantially solid and water-insoluble or water-resistant state to provide a tough, resilient, water-containing mass which is a gel or in the nature of a gel. In addition, by employing a polyamino compound or combination of polyamino compounds as a hardening agent in combination with composition (I), it is possible to obtain more uniform and a greater proportion of squeeze-out from such combinations over a wider range of viscosities than would be possible if only an aldehyde-reactive phenol-aldehyde reaction product were employed. Further, such a cured squeeze-out, when compared with that in which only aldehyde-reactive phenol-aldehyde reaction product is combined with composition (I), is harder, tougher, of a more rubbery nature, has greater tensile and compressive strengths and is a gel having greater water resistance.

It is also within the purview of this invention to combine with combinations of composition (I) and hardening agent (A) one or a combination of two or more other agents (B) such as aldehydes, aldehyde-reactive phenols, aldehyde-reactive phenol-aldehyde organic reaction products, acidic agents, alkaline agents, etc. Among some of the aldehydes which are preferably employed as agent (B) are formaldehyde, hexamethylene tetramine (aldehyde donor), furfuraldehyde, acetaldehyde, etc. Among some of the aldehyde-reactive phenols which are preferably employed as agent (B) are hydroxy benzene, the various cresols, cardol, catechol, hydroquinone, resorcinol, etc. Among some of the aldehyde-reactive phenol-aldehyde organic reaction products preferably employed as agent (B) are those described in Examples S-1, S-2, and HS-1 to HS-9 of U.S. copending application Ser. No. 662,830 filed May 31, 1957 and made part hereof. Among the acidic agents which are preferably employed as agent (B) are the mineral acids such as sulfuric acid, hydrochloric acid, phosphoric acid, boric acid, as well as ferric chloride, etc., and/or organic acids such as tannic acid, paratoluene sulphonic acid, hydroxy acetic acid, phthalic acid, maleic acid, sebacic acid, succinic acid, acetic acid, butyric acid, lactic acid, oxalic acid, etc., as well as such available anhydrides thereof. Among some of the alkaline materials preferably employed as agent (B) are the inorganic alkaline materials, such as borax, caustic soda, lime etc.

The addition of one or more of said agents (B) modifies the characteristics of the combination of composition (I) and agent (A) and the manner of modification depends upon the particular agent or combination of agents (B) employed. For example, in general when the acidic agents are so employed, they serve to retard the increase in viscosity of the mass during the pumping period, whereas the alkaline materials serve as accelerators tending to speed up the reaction between agent (A) and ketone-aldehyde reaction product at the temperature encountered at the area to be sealed.

GENERAL EXAMPLE

Into a mixing vessel suitable for use in the preparation of cement slurries is charged the requisite amount of (a) water to provide an ultimate slurry of the desired viscosity and generally of 1–10 poises at 80° F., (b) one or a combination of two or more of said ketone-aldehyde organic reaction products, examples of which are products A—LL, and (c) one or a combination of two or more polyamino compounds with the ratio by weight of (c) to (b) being 2–30 parts of (c) for each 100 parts of (b). This essential combination of (a), (b) and (c) may be modified by adding thereto one or a combination of two or more of the following: 5–30 parts of (d) an aqueous solution of formaldehyde (37% conc.) for each 100 parts of (b); 2–50 parts of (e) one or a combination of two or more aldehyde-reactive phenol-aldehyde organic reaction products for each 100 parts of (b); 1–30 parts of (f) one or a combination of two or more acidic agents, 1–20 parts of (g) one or a combination of two or more aldehyde-reactive phenols, (h) one or a combination of two or more inorganic alkaline agents, in amount sufficient to impart a pH of at least 9.5 to said (b), alone may be used. After said solution of (a), (b) and (c) with or without any of the aforesaid is obtained, to said solution, while being maintained at 80° F. and while being constantly stirred, there is added (i) one or a combination of two or more hydraulic cements to provide a smooth slurry, substantially free of lumps and being substantially uniform throughout and of substantially uniform consistency. The ratio by weight of (i) to (b) is 1–10 parts of (i) for each 10 parts of (b).

Instead of providing such solution of (a), (b) and (c) with or without one or more of said components (d)—(i), (b) may be reacted with (c) to provide a water-soluble or water-dispersible organic reaction product which may be combined with a suitable amount of (a); or (b) may be reacted with (e), (f) or (g) to provide a water soluble or water dispersible organic reaction product which may be combined with (c) and a suitable amount of (a); or (b) may be reacted with (f) in the presence or absence of (c) to provide a water soluble or water dispersible organic reaction product which may be combined with (c) and a suitable amount of (a); or (b) may be reacted with (c) and then with (g) to provide water soluble or water dispersible organic reaction products which may be combined with a suitable amount of (a); or (c) may be reacted with (g) to provide water soluble or water dispersible organic reaction products which may be combined with (b) and a suitable amount of (a). In the aforesaid, the ratio of components are as before described, and to each of these various combinations is added (i) to provide a slurry, with the amount of (i) being 1–10 parts for each 10 parts of (b) employed.

Examples of some of these various combinations of (b) and (c) and reaction products thereof are those disclosed in our copending application Ser. No. 612,932 filed October 1, 1956 and which in its entirety is made part hereof.

The following are illustrative examples of organic reaction products of a polyamino compound with a ketone-aldehyde organic reaction product which may be employed as a component in the practice of this invention.

Example KAP 280 grams of aqueous solution of product D (80% conc.) and 8 grams of dicyandiamide were mixed together and warmed to approximately 100° F. and maintained at that temperature for approximately 15 minutes. This reaction product was cooled to room temperature and the water content thereof was adjusted to provide an 80% solution and such solution is hereinafter known as product KAP.

Example KAM 1200 grams aqueous solution of product D (80% conc.) and 60 grams of melamine were mixed together and heated to a temperature of 180–190° F. and maintained in that temperature range for a period of approximately 2 hours and then cooled to room temperature. Then a quantity of water was added thereto in an amount sufficient to provide an 80% aqueous solution and such solution is hereinafter known as product KAM.

The following are examples of some of the compositions of matter of this invention given merely by way of illustration and not limitation, all parts given by weight unless otherwise specified.

Example 1

Into a Waring Blendor were charged 120 g. of water, 28 g. of calcium cyanamide and 280 g. of an aqueous solution of product D (80% conc.) to provide a substantially uniform solution. Then to said solution in said blender were added 400 g. of Portland cement (A.S.T.M. designation C–150, type 1 cement). The mass was mixed in said blender for one minute and immediately thereafter poured into a Halliburton Consistometer, disposed in a water bath maintained at 100° F. The cylinder of said Consistometer into which said mass was charged is continuously rotated until the viscosity of the mass therein measures 40 poises. In this instance, at the end of 50 minutes, the viscosity of said mass had increased to 40 poises. At the end of that period, said mass, having a viscosity of 40 poises, was charged in a Baroid low pressure filter press No. 102 in which filter paper was employed as the filtering medium. Then pressure of approximately 100 lbs. per sq. in. was applied thereto by the use of nitrogen whereupon a filtrate, measuring approximately 30 grams was obtained. The filtrate was a clear solution containing water, ketone-aldehyde, polyamino compound and calcium hydroxide leached out or otherwise derived from the Portland cement in said system. This filtrate contained in a closed test tube was then placed in an oven maintained at 100° F. and was allowed to remain therein for a period of 24 hours. At the end of that period the mass was found to have been converted from the liquid state to the substantially solid state. The material was allowed to cool to room temperature and removed from its container, and was found to be a substantially homogeneous water-containing mass, which was tough but rubbery and was a gel or in the nature of a gel. Then it was subjected to a penetration test by means of a Vicat penetrometer which was found to be 5 mm. in 30 seconds at 70° F. The remainder, or the residue, after said filtering was placed in a container and placed in said oven at 100° F. for 24 hours and at the end of that period was found to be hard, firm and set.

Example 2

Repeat verbatim Example 1, except that: 28 grams of 1,3,5(dimethyl-amino-methane)-phenol (known on the market as "DMP-30") is substituted for the 28 grams calcium cyanamide; 120° F. is substituted for 100° F. and 130 minutes is substituted for the 50 minutes; and 6 mm. penetration is substituted for the 5 mm. therein.

Example 3

Repeat verbatim Example 1, except that: 28 grams of ethylene diamine together with 10 grams of phthalic anhydride was substituted for the 28 grams of calcium cyanamide; 100 minutes is substituted for the 50 minutes and 11 mm. penetration is substituted for the 5 mm. therein.

Example 4

Repeat verbatim Example 1, except that: 28 grams of

"DMP–30" together with 10 grams of phthalic anhydride were substituted for the 28 grams of calcium cyanamide; 140° F. is substituted for the 100° F.; 120 minutes is substituted for the 50 minutes; and 2 mm. penetration is substituted for the 5 mm.

Another Vicat penetrometer test on this mass which tested 2 mm. at 70° F. was made at 140° F. and at this temperature was found to be 15 mm.

Example 5

Repeat verbatim Example 1, except that: 28 grams ethylene diamine together with 10 grams boric acid were substituted for the 28 grams of calcium cyanamide; 140° F. is substituted for the 100° F.; 135 minutes is substituted for the 50 minutes and 16 mm. penetration is substituted for the 5 mm. therein.

Example 6

Repeat verbatim Example 1, except that: 28 grams of ethylene diamine together with 20 grams boric acid were substituted for the 28 grams of calcium cyanamide; 160° F. is substituted for the 100° F.; 76 minutes is substituted for the 50 minutes and 12 mm. penetration is substituted for the 5 mm. therein.

Example 7

Repeat verbatim Example 1, except that: 28 grams of dicyandiamide together with 20 grams of boric acid were substituted for the 28 grams of calcium cyanamide; 180° F. is substituted for the 100° F.; 70 minutes is substituted for the 50 minutes and 15 mm. penetration is substituted for the 5 mm. therein.

Example 8

Repeat verbatim Example 1, except that: 28 grams methyl diamine is substituted for the 28 grams of calcium cyanamide; 120° F. is substituted for the 100° F.; 70 minutes is substituted for the 50 minutes and less than 20 mm. penetration is substituted for the 5 mm. therein.

Example 9

Repeat verbatim Example 1, except that: 28 grams metaphenylenediamine is substituted for the 28 grams of calcium cyanamide; 120° F. is substituted for the 100° F.; 15 minutes is substituted for the 50 minutes and less than 20 mm. penetration is substituted for the 5 mm. therein.

Example 10

Repeat verbatim Example 1, except that: 28 grams of ethylene diamine is substituted for the 28 grams of calcium cyanamide; 60 minutes is substituted for the 50 minutes and less than 20 mm. penetration is substituted for the 5 mm. therein.

Example 11

Repeat verbatim Example 1, except that: 28 grams of ethylene diamine is substituted for the 28 grams of calcium cyanamide; 120° F. is substituted for the 100° F.; 20 minutes is substituted for the 50 minutes and less than 20 mm. penetration is substituted for the 5 mm. therein.

Example 12

Repeat verbatim Example 1, except that: 28 grams of adipyl dihydrazide is substituted for the 28 grams of calcium cyanamide; 140° F. is substituted for the 100° F.; 126 minutes is substituted for the 50 minutes and less than 20 mm. penetration is substituted for the 5 mm. therein.

Example 13

Repeat verbatim Example 1, except that: 28 grams of azelayl dihydrazide is substituted for the 28 grams of calcium cyanamide; 140° F. is substituted for the 100° F.; 60 minutes is substituted for the 50 minutes and less than 20 mm. penetration is substituted for the 5 mm. therein.

Example 14

Repeat verbatim Example 1, except that: 28 grams of azelayl dihydrazide together with 10 grams of phthalic anhydride are substituted for the 28 grams of calcium cyanamide; 140° F. is substituted for the 100° F.; and less than 20 mm. penetration is substituted for the 5 mm. therein.

Example 15

Repeat verbatim Example 1, except that: 28 grams of isophthalyl dihydrazide is substituted for the 28 grams of calcium cyanamide; 140° F. is substituted for the 100° F.; 37 minutes is substituted for the 50 minutes and less than 20 mm. penetration is substituted for the 5 mm. therein.

Example 16

Repeat verbatim Example 1, except that: 28 grams of dicyandiamide is substituted for the 28 grams of calcium cyanamide; 140° F. is substituted for the 100° F.; 60 minutes is substituted for the 50 minutes and less than 20 mm. penetration is substituted for the 5 mm. therein.

Example 17

Repeat verbatim Example 1, except that: 28 grams of melamine is substituted for the 28 grams of calcium cyanamide; 140° F. is substituted for the 100° F.; 85 minutes is substituted for the 50 minutes and less than 20 mm. penetration is substituted for the 5 mm. therein.

Example 18

Repeat verbatim Example 1, except that: 28 grams of ethylene diamine together with 10 grams maleic anhydride were substituted for the 28 grams of calcium cyanamide; 140° F. is substituted for the 100° F.; 57 minutes is substituted for the 50 minutes and less than 20 mm. penetration is substituted for the 5 mm. therein.

Example 19

Repeat verbatim Example 1, except that: 28 grams p,p′-methylene dianiline is substituted for the 28 grams of calcium cyanamide; 140° F. is substituted for the 100° F.; 5 minutes is substituted for the 50 minutes and less than 20 mm. penetration is substituted for the 5 mm. therein.

Example 20

Repeat verbatim Example 1, except that: 28 grams of piperazine is substituted for the 28 grams of calcium cyanamide; 140° F. is substituted for the 100° F.; 40 minutes is substituted for the 50 minutes and less than 20 mm. penetration is substituted for the 5 mm. therein.

Examples 21 and 22

Still other specific examples of this invention are compositions comprising 120 grams of water, 280 grams of products KAP and KAM respectively, 400 grams Portland cement (identified in Example 1) and 24 grams of calcium cyanamide, held in an oven for 24 hrs. at 100° F. gave a material having a Vicat penetration of less than 10 mm. respectively.

It is also within the purview of this invention to provide novel compositions containing no hydraulic cement, and such compositions find utility as sealants for such bore hole walls and the use of such compositions for such purpose has the advantage of not requiring any squeeze-out procedure which is necessary when cement is a component and also the efficiency of use is greatly increased.

Said other novel compositions are the same as the other compositions heretofore described except that in each case the pH of the composition is at least 9.5 which may be attained by the use of one or a combination of two or more of said polyamino compounds with or without one or more alkaline materials, such as said inorganic alkaline materials heretofore set forth, and the following are examples given merely by way of illustration of such compositions.

Example 23

100 grams of an aqueous solution of product D (80% conc.) 40 grams of water, 5 grams of lime and 5 grams of diethylene triamine were placed in a container and mixed to substantial uniformity. The container was then covered and placed in an oven maintained at 160° F. for approximately 24 hours. After one hour in the oven the material was examined and found still to be in the liquid pumpable condition. At the end of 24 hours it was again examined and found to be a substantially homogeneous water-containing mass which was substantially solid, was very tough and of a rubbery nature and was a gel or in the nature of a gel having a Vicat penetration under 10 mm.

Example 24

Repeating Example 23 except that 2½ grams of lime were substituted for the 5 grams of lime and 10 parts of "DMP-30" were substituted for the 5 grams of diethylene triamine, to produce a substantially homogeneous water-containing mass which was substantially solid, was very tough and of a rubbery nature and was a gel or in the nature of a gel and had a Vicat penetration under 10 mm.

Example 25

Repeating Example 23 except that 2½ grams of lime were substituted for the 5 grams of lime and 7½ grams of triethylene tetramine were substituted for the 5 grams of diethylene triamine, to produce a substantially homogeneous water-containing mass which was substantially solid, was very tough and of a rubbery nature and was a gel or in the nature of a gel and had a Vicat penetration under 10 mm.

Examples 26–28

Repeating Examples 23, 24 and 25 respectively, except that for the 100 parts of aqueous solution of product D there were substituted 100 parts of an 80% aqueous solution of product DD, to produce substantially homogeneous water-containing masses which were substantially solid, were very tough and of a rubbery nature and were gels or in the nature of gels and had Vicat penetration of less than 10 mm.

Example 29

100 parts of an 80% aqueous solution of product D, 40 parts of water, 10 parts of metaphenylene diamine were placed in a small glass container and stirred together to uniformity. The container was capped and placed in an oven and maintained at 180° F. for 24 hours. At the end of that period it was found to be a substantially homogeneous water-containing mass which was substantially solid, was very tough and of a rubbery nature and was a gel or in the nature of a gel and had a Vicat penetration of less than 10 mm.

Example 30

Repeating Example 29 except that for the 10 parts metaphenylene diamine there were substituted 8 grams of propylene diamine and 5 parts of a 10% NaOH solution to produce a substantially homogeneous water-containing mass which was substantially solid, was very tough and of a rubbery nature and was a gel or in the nature of a gel and had a Vicat penetration of less than 10 mm.

Example 31

Repeating Example 29 except that for the 10 parts metaphenylene diamine there were substituted 10 parts of triethylene tetramine to produce a substantially homogeneous water-containing mass which was substantially solid, was very tough and of a rubbery nature and was a gel or in the nature of a gel and had a Vicat penetration of less than 10 mm.

Example 32

Repeating Example 23 except that for the 5 grams of lime there were substituted 2 grams of lime; for the 5 grams of diethylene triamine there were substituted 10 grams of diethylene tetramine and 5 grams of resorcinol which resulted in a substantially homogeneous water-containing mass which was substantially solid, was very tough and of a rubbery nature and was a gel or in the nature of a gel and had a Vicat penetration of less than 10 mm.

Instead of employing the particular amino compounds in the Examples 1–32, polyisocyanates or blocked polyisocyanates may be substituted wholly or in part therefor. The blocked isocyanates which we preferably employ are those formed by using a phenol and isocyanate to form a phenol-isocyanate. The use of polyisocyanates or blocked polyisocyanates in said compositions of matter provide compositions of matter having different pumping times for temperature employed.

Example 33

Following the procedure and employing the components of Example 23, except that 10 grams of toluene diisocyanate was substituted for the 5 grams of diethylene triamine and the oven temperature was 100° F. instead of 160° F.

Example 34

Following the procedure and employing the components of Example 23, except that 10 grams of blocked isocyanate "Mobay No. 507" were used in place of the 5 grams of diethylene triamine and the oven temperature was 180° F. instead of 160° F.

Moreover, all of the examples of the present invention may be modified by adding thereto normally liquid glycidyl ethers of phenols containing at least two hydroxy groups, an example of which is Shell Epon 828.

According to this invention, the novel compositions of matter hereinbefore set forth may be used in the following manner, given merely by way of illustration and not limitation to show methods of application.

In a case where during the drilling operation of an oil or gas well, as shown in FIG. 1, there is a casing 10 extending partially into the bore hole. In the particular formation shown in FIG. 1, for the purposes of illustration, that part 11 of the bore hole below the casing 10 extends through a water bearing opening or stratum 12 between a pair of impervious strata 13 and 14. Because water from the opening or stratum 12 flows into the bore hole, for obvious reasons it becomes necessary to seal or plug the opening or stratum 12 to reduce and more preferably to prevent completely the flow of water therefrom into the bore hole.

Also according to this invention, the aforesaid results may be attained by employing the various compositions of matter of this invention, examples of which are the compositions of matter disclosed in Examples 1–22, immediately after the components thereof are mixed together. Of course, it is understood that a large mixer is employed and the amount of each of the components of such compositions of matter is increased to the desired quantity, however, the ratio by weight of the respective components to each other are the same as those disclosed in said Examples 1–22. An appropriate quantity of a slurry produced by employing the conponents of Example 1 in the proportions therein set forth and immediately after mixing them, and hereinafter known as slurry 1, for example, is pumped through the casing 10 to fill the part 11 of the bore hole and until its level is well up into the lower end of casing 10 whereby some of the slurry 1 is located in the space between the outside of the lower end of the casing 10 and the bore hole wall adjacent thereto. Then while the slurry 1 is subjected to superatmospheric pressure, more of the slurry extends further up outside of the casing and that in part 11 has some of the water, ketone-aldehyde and polyamino compound thereof "squeezed out" or forced out of the slurry to provide an outer layer 15 rich in the ketone-aldehyde polyamino compound components, with the inner part 16 now being richer in the Portland cement component. The ketone-aldehyde polyamino compound rich outer layer 15 containing polyamino compound and water, extends into the hole or water bearing stratum and together with the Portland cement rich inner part, seals or plugs stratum 12. The pressure is maintained for the required period of time and after the layers 15 and 16 have become set or hardened within 24 hours to seal or plug stratum 12, a drilling tool is lowered through casing 10 and the bulk of the mass of hardened or set slurry in part 11 and rich in Portland cement is drilled through, leaving the bore hole wall as shown in FIG. 1 with the stratum or hole 12 substantially completely sealed or plugged by the ketone-aldehyde rich inner covering or layer 15 now in the substantially solid state and contiguous with the hardened or set Portland cement rich layer 16. The layer 15 is further characterized as being a substantially uniform water-containing mass, substantially water insoluble and infusible at 300° F. and is a gel or in the nature of a gel. Drilling may be continued through the lower impervious layer if desired.

Figure 2:
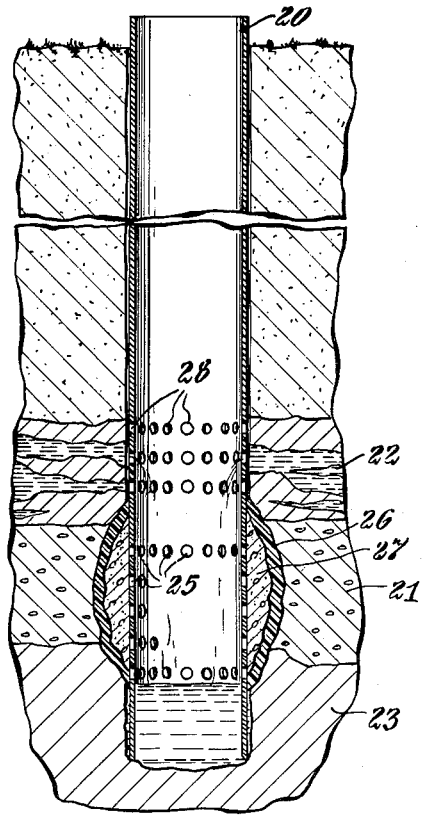
FIG. 2 is a shortened vertical view in section showing a bore hole wall embodying the invention.

In another case in the oil or gas well field, there is a casing 20 in the earth bore hole. In the particular formation shown in FIG. 2, for the purposes of illustration, the casing 20 extends through a water bearing stratum 21 between an upper oil and gas bearing stratum 22 and a lower impervious stratum 23. Because water from stratum 21 enters the casing 20, it becomes necessary to seal it off if possible. The casing may be shot at its lower end in the manner known to the art to provide openings 25 therethrough which are adjacent the water bearing strata. Like before, a slurry such as slurry 1, for example, is pumped into the lower part of the casing 20 and under pressure through the holes 25 and into the space between the outer side of the casing and the stratum 21 and into stratum 21 and maintained under pressure for a sufficient time and generally up to 24 hours. After setting, like in FIG. 1, there will be a seal or plug of a ketone-aldehyde rich outer layer 26 which is now solidified like layer 15 and an outer layer of set or hardened Portland cement rich layer 27 like layer 16. If desired, the hardened slurry within the casing 20 may be drilled out. Then the casing 20 is shot through to provide openings 28 around the oil and gas bearing stratum 22, and now with stratum 21 sealed off, the well produces oil and gas without large quantities of water from stratum 21.

Figure 3:
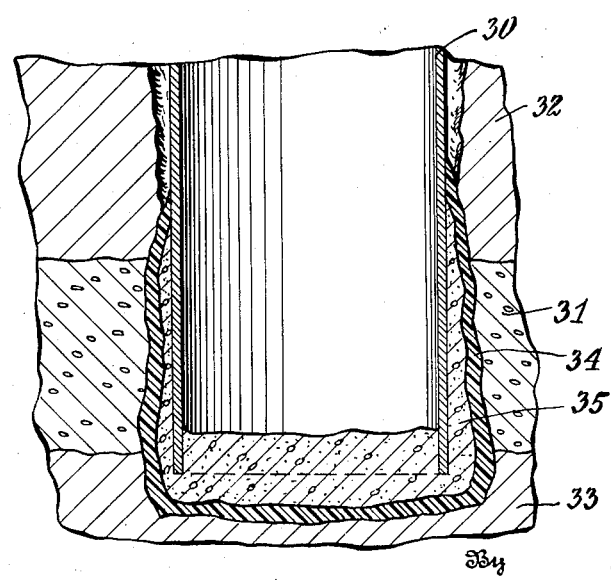
FIG. 3 is a shortened vertical view in section showing a bore hole wall embodying the invention.

In the case shown in FIG. 3, there is a casing 30 in the bore hole with the lower end thereof through a pervious or water bearing stratum 31 between a pair of impervious strata 32 and 33. In order to seal off the stratum 31 like before, slurry 1, for example, is pumped through the casing 31 to a level above the lower extremity thereof and is under pressure to drive the slurry upwardly in the space between the casing and the stratum 31 and the organic reaction product components are squeezed outwardly to provide a polyamino compound containing ketone-aldehyde rich outer layer 34 and a Portland cement rich inner layer 35. The pressure is maintained for the desired period of time, that is, up to about 24 hours. After setting, like in FIG. 1, there will be a plug or seal of ketone-aldehyde rich inner layer 34 which is now solidified and is like 15 and an outer layer of set or hardened Portland cement rich outer layer 35, like layer 16, blocking off or sealing the stratum 31, and also plugging the end of the casing. If it is desired to extend the bore hole, all that need be done is to drill through the plug hardened at the end of the casing and the remainder of the hardened mass between the casing and the stratum 31 will remain to effectively plug or seal that stratum.

Figure 4:
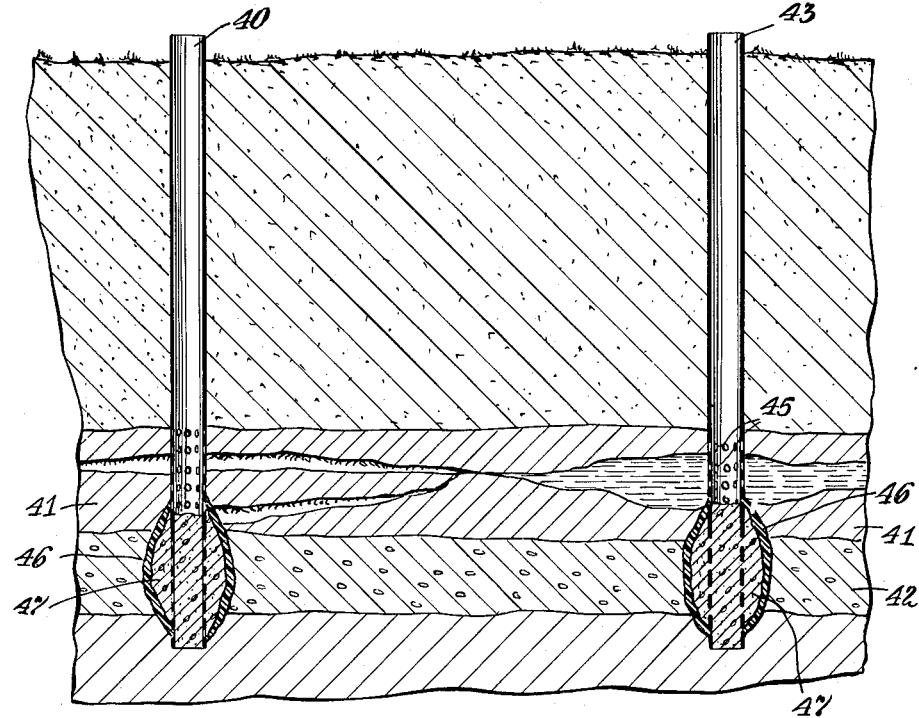
FIG. 4 is a shortened vertical view of bore hole wall embodying the invention.

In still another case in the oil field, there may be a dry well with a casing 40 as shown in FIG. 4. The lower end of the casing 40 extends through adjacent layers or strata 41 and 42, with the layer 41 being oil bearing while the stratum 42 is highly pervious and may or may not be loaded with water. Another bore hole may be drilled a considerable distance from casing 40 and there may be located therein a pipe or casing 43 the lower end of which has holes 45 therethrough as does the lower end of casing 40. Fluid, such as water, under pressure is forced into casing 43 with the purpose of forcing the oil out of stratum 41 into casing 40. Because the stratum 42 is pervious, the water under pressure follows the path of least resistance and therefore the fluid forced into casing 40 would be mostly water. Therefore it is necessary to remedy that condition and for this purpose, a slurry such as slurry 1 is pumped into the lower end of each of the casings 40 and 43 to fill the lower parts and to be forced through the casing openings into the stratum 42 and, as before, is maintained under pressure until set and hardened. And, like in FIG. 1, there is an outer layer 46 rich in ketone-aldehyde which has been set and an inner Portland cement rich layer 47 which has been hardened and set. Now with fluid under pressure in casing 43, the fluid is blocked off from the now sealed pervious layer 42 and its pressure is exerted on the oil in the stratum 41 to force it into and up through casing 40.

Figure 5:
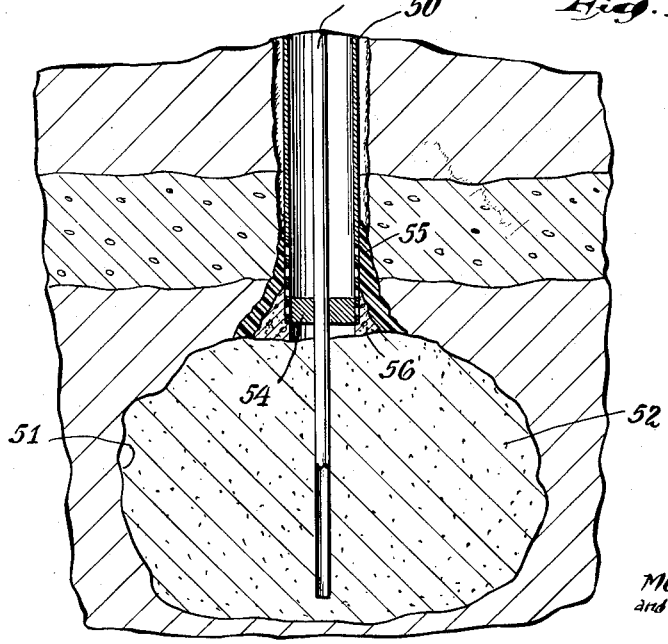
FIG. 5 is a shortened vertical view showing a bore hole wall, with the casing sealed to the bore hole wall and embodying the invention.

In still another case in the oil or gas well field, there may be a dry well or a well of salt deposit with a casing 50 extending through the earth into well 51 filled with salt 52 as shown in FIG. 5. In this case the object might be to dissolve and flush out the salt so that the well could be employed as a natural storage tank for gasses and the like. In order that the well may be employed for this purpose, it might be necessary to seal the lower end of the casing to the outlet mouth of the well to prevent the escape of gasses, for example, which may be forced into the well. This may be accomplished by plugging the lower end of the casing 50 with a plug 54 and the holes are shot through the lower end of the casing. A slurry such as slurry 1, for example, is pumped down into the casing 50 and is forced out through the shot holes therein into the space between the lower end of the casing and the mouth of the well. Ordinarily the salt level is close to the lower extremity of the casing. The slurry thus becomes applied to the earth bore structure and is maintained under pressure whereupon it is driven upwardly in the space between the casing 50 and the earth therearound at the lower part of the well and the reaction products components are squeezed outwardly to provide a polyamino compound containing ketone-aldehyde rich outer layer 55 and a Portland cement rich inner layer 56. This pressure is maintained for the desired period of time and after setting, like in FIG. 1, there will be a plug or seal of ketone-aldehyde rich outer layer which is now solidified and a set or hardened Portland cement rich inner layer. Then that portion of the slurry which has become hardened and is located in the bottom of the casing, is drilled out as well as the plug so that there may now be extended through the length of the casing, a pipe 57 through which water may be admittted to the salt to dissolve it and the salt solution is forced upwardly through the casing 50. In this illustrative example, it is apparent that there is provided a seal between the lower end of the casing and the mouth of the well and this seal prevents the escape of gas which is admitted into the storage chamber 51 after the salt has been removed therefrom in the manner heretofore set forth.

Instead of employing such novel slurries containing hydraulic cement as a component, certain other polyamino compound containing compositions free of hydraulic cement may be employed. Said other compositions comprise any of such ketone-aldehyde organic reaction products, water and a polyamino compound which imparts a pH of 9.5 to the mass. Such a mass having a pH of at least 9.5 may contain an inorganic compound. Examples of said other compositions free of hydraulic cement are the compositions of Examples 23–34. These compositions may be applied to the area to be sealed and thereat set to produce substantially homogeneous water-containing substantially solid masses resistant to water and oil. In this manner the bore hole walls may be sealed to provide a wall structure whose openings are sealed and if made up of loose parts whose parts are sealed together to provide an oil and water resistant wall structure. Also, after the application of such compositions of the type set forth in Examples 23–34, a straight cement and water slurry or a slurry of the type disclosed in our application Ser. No. 658,883 filed May 13, 1957 and issued as U.S. Patent 2,828,820 on April 1, 1958 or a slurry of the type disclosed in our copending application Ser. No. 662,830 filed May 31, 1957 or a slurry of the type disclosed in Examples 1–22 herein, may be applied to that area to be treated.

In any case, after application of any of such compositions of the type of Examples 23–34 herein, such composition impregnates that part of the wall to be sealed and at the temperature of said part, is converted to a substantially homogeneous water containing mass which is substantially solid and oil and water resistant.

Of course, it is understood that various other slurries, such as those produced immediately upon combining the components of Examples 2–22 respectively in the proportions therein set forth, may be used instead of that identified as slurry 1; and any of the other ketone-aldehyde reaction products, examples of which are products A—C and E—JJ may be substituted for product D in slurry 1. Also, the ratio of Portland cement or other hydraulic cement to the ketone-aldehyde reaction product may be varied over very wide limits as may be the quantity of water used. Also there may be substituted other inorganic alkaline material in place of the Portland cement. When no Portland cement is used, the quantity of calcium hydroxide employed may be 2% or more by weight of the ketone-aldehyde in solution or slurry or such chemical equivalent of the calcium hydroxide may be used.

Also, one or more other additives may be employed together with compositions in Examples 1–34 for various purposes, for example, to control the setting time of the mass, to control the nature or characteristics of the mass when set or for a variety of other reasons. Other materials usable with the ketone-aldehyde organic reaction products and adapted to serve as catalysts or setting agents together with or in place of the alkaline clays (bentonite, etc.), plaster of Paris and Portland cement are water soluble amines (aniline), triethylamine and similar amines, sodium-, potassium- and ammonium-cassinates, animal glue, blood albumen, egg albumen, lime, soda ash, potash and other water soluble alkaline materials. Some other substances which may be employed as additives are formaldehyde reaction products of other ketones, such as methyl ethyl ketone, mesityl oxide, isopropyl methyl ketone, furfural-ketone reaction products, furfuryl alcohol, furfuryl alcohol-formaldehyde reaction products, partially hydrogenated furfural-ketone reaction products in which the degree of hydrogenation is 15%–65% of the amount of hydrogen required to saturate all carbon to carbon double bonds, also said polymers of said partially hydrogenated furfural-ketone reaction products, alkyd resins, polyester resins, epon resins and phenolic resins, such as the phenol-aldehyde resins, cashew liquid derivatives and urea resins.

It is also within the purview of this invention to substitute the ketone-aldehyde resins herein entirely or in part for the resin component of other known compositions and especially those also containing an hydraulic cement and used to treat the bore hole wall structure for the purposes hereinbefore set forth.

Besides being useful to treat bore hole structures, said compositions of hydraulic cement, water and ketone-aldehyde with agent (A) and/or agent (B) are also useful for the production of ceramic pipes and conduits, roadways, sidewalks, tank linings and other protective surfaces.

Also in the treatment of an earth bore wall, it may not always be required to have the slurry, such as slurry 1, under such pressure as to squeeze out the ketone-aldehyde rich layer as shown in the drawings and as described herein. Such illustrations are set forth merely to show types of useful compositions of matter. In some cases the composition of matter may be put in place and, without any appreciable squeezing out of any of the reaction products, is allowed to set to the substantially solid set state, with the hydraulic cement, ketone-aldehyde organic reaction product, agent (A) with or without agent (B), solidified en masse and set, and being substantially uniformly distributed with respect to each other.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention, which as a matter of language might be said to fall therebetween; and that they are intended to be inclusive in scope and not exclusive, in that, if desired, other materials may be added to our novel composition of matter herein claimed without departing from the spirit of the invention. Particularly it is to be understood that in said claims, ingredients or components recited in the singular are intended to include compatible mixtures of said ingredients wherever the sense permits.

This application is a continuation in part of our copending applications Serial No. 662,830 filed May 31, 1957 and Serial No. 658,883 filed May 13, 1957 which issued into U.S. Patent 2,828,820 on April 1, 1958 and which in turn is a continuation in part of our copending application Serial No. 350,982 filed on April 24, 1953, which since has been abandoned and which in turn is a continuation in part of our application Serial No. 122,852 filed October 21, 1949 and now abandoned, which in turn was a continuation in part of our application Ser. No. 99,114 filed June 14, 1949 and issued as Patent No. 2,683,133 on July 6, 1954 and also is a continuation in part of our copending applications Serial No. 492,052 filed March 3, 1955 which since has been abandoned and 612,932 filed October 1, 1956 and issued as U.S. Patent 2,953,478 on September 20, 1960. All of said applications are hereby made part hereof.

Having thus described the invention, what we claim is:

1. A composition of matter comprising hydraulic cement, water and a normally water-soluble ketone-aldehyde organic reaction product in combination with a polyamino compound said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

2. A composition of matter comprising Portland cement, water and a normally water-soluble ketone-aldehyde organic reaction product in combination with a poly-amino compound said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

3. A composition of matter comprising Portland cement, water and a normally water-soluble acetone-formaldehyde organic reaction product in combination with a polyamino compound said compound characterized as follows: when a mixture consisting of 94 grams hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said acetone-formaldehyde reaction product in the presence of water to produce a substantially homogeneous water-containing solid mass resistant to water.

4. A composition of matter comprising hydraulic cement, water and a normally water-soluble acetone-formaldehyde organic reaction product and another ketone-aldehyde organic reaction product in combination with a polyamino compound said compound characterized as follows: when a mixture consisting of 94 grams hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said acetone-formaldehyde reaction product in the presence of water to produce a substantially homogeneous water-containing solid mass resistant to water.

5. A composition of matter comprising Portland cement, water and a normally water-soluble acetone-formaldehyde organic reaction product and another ketone-aldehyde organic reaction product in combination with a polyamino compound said compound characterized as follows: when a mixture consisting of 94 grams hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said acetone-formaldehyde reaction product in the presence of water to produce a substantially homogeneous water-containing solid mass resistant to water.

6. A composition of matter comprising hydraulic cement, water and a normally water-soluble mixed ketone-aldehyde organic reaction product in combination with a polyamino compound, at least one of said ketones being acetone said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

7. A composition of matter comprising hydraulic cement, water and a normally water-soluble organic reaction product of polyamino compound and ketone-aldehyde organic reaction product said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

8. A pumpable composition of matter having a pH of at least 9.5 comprising a normally water-soluble ketone-aldehyde organic reaction product produced by reacting 1 mole of ketone with at least 2 moles of aldehyde, water and a polyamino compound said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

9. A pumpable composition of matter having a pH of at least 9.5 and comprising water-soluble ketone-aldehyde organic reaction product produced by reacting 1 mole of ketone with at least 2 moles of aldehyde, water, a polyamino compound and an inorganic alkaline material said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

10. A composition of matter comprising hydraulic cement, water and water-soluble ketone-aldehyde organic reaction product in combination with a polyamino compound, said composition being capable of being filtered to provide an aqueous filtrate containing at least some of said water, ketone-aldehyde and said polyamino compound, said filtrate being capable of being heat converted to the substantially solid state said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

11. A composition of matter comprising water, hydraulic cement and water-soluble organic reaction product of a polyamino compound and a ketone-aldehyde organic reaction product, said composition being capable of being filtered to provide an aqueous filtrate containing at least some of said water, ketone-aldehyde organic reaction product and said polyamino compound, said filtrate being capable of being heat converted to the substantially solid state said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

12. In a method for sealing an earth bore wall, comprising applying to a portion thereof a slurry comprising hydraulic cement, water and an acetone-formaldehyde organic reaction product in combination with a polyamino compound said compound characterized as follows: when a mixture consisting of 94 grams hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said acetone-formaldehyde reaction product in the presence of water to produce a substantially homogeneous water-containing solid mass resistant to water.

13. In a method for sealing an earth bore wall comprising applying thereto a composition having a pH of at least 9.5 and containing water, acetone-formaldehyde organic reaction product, a polyamino compound and calcium hydroxide said compound characterized as follows: when a mixture consisting of 94 grams hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said acetone-formaldehyde reaction product in the presence of water to produce a substantially homogeneous water-containing solid mass resistant to water.

14. In a method for sealing an earth bore wall comprising applying to said earth bore wall a slurry containing hydraulic cement, water, water-soluble ketone-aldehyde organic reaction product and a polyamino compound mixed with each other said compound characterized as follows: when a mixture consisting of 94 grams of hydroxybenzene and a number of grams of said compound equal to its molecular weight divided by the number of amino groups therein its heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

15. In a method for sealing an earth bore wall comprising applying to an earth bore wall an aqueous composition having a pH of at least 9.5 and containing a water-soluble ketone-aldehyde organic reaction product and a polyamino compound said compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for a period of about 10 minutes, at the end of that period the mass is water soluble; said compound capable of being reacted with said ketone-aldehyde reaction product in the presence of water to produce a substantially homogeneous water-containing solid mass resistant to water.

16. A composition of matter comprising hydraulic cement, water and normally water-soluble ketone-aldehyde organic reaction product in combination with a polyamino compound, said polyamino compound being characterized as follows: when a mixture consisting of 94 grams (1-gram mole) of hydroxybenzene and a number of grams of such polyamino compound equal to its molecular weight, divided by the number of amino groups therein is heated to 150° C. and maintained at that temperature for 4 hours, at the end of that period the resultant mass is liquid at 150° C. and is further characterized as follows: when 1 mole of the polyamino compound and 2 moles of aqueous formaldehyde (37% conc.) are heated to 90° C. and maintained at that temperature for a period of about 10 minutes, at the end of that period the mass is water soluble.

17. A pumpable composition of matter having a pH of at least 9.5 and comprising water-soluble ketone-aldehyde organic reaction product, water, a polyamino compound and an inorganic alkaline material, said polyamino compound being characterized as follows: when a mixture consisting of 94 grams (1-gram mole) of hydroxybenzene and a number of grams of such polyamino compound equal to its molecular weight, divided by the number of amino groups therein is heated to 150° C. and maintained at that temperature for 4 hours, at the end of that period the resultant mass is liquid at 150° C. and is further characterized as follows: when 1 mole of the polyamino compound and 2 moles of aqueous formaldehyde (37% conc.) are heated to 90° C. and maintained at that temperature for a period of about 10 minutes, at the end of that period the mass is water soluble.

18. In a method as defined in claim 14, with said ketone-aldehyde organic reaction product being liquid, water soluble acetone-formaldehyde organic reaction product.

19. In a method as defined in claim 15, with said ketone-aldehyde reaction product being liquid, water soluble acetone-formaldehyde organic reaction product.

20. A pumpable composition of matter comprising a water-soluble acetone-formaldehyde resinous reaction product, a polyamino compound and water, the viscosity of said composition of matter at 80° F. being no greater than 10 poises, said resinous reaction product produced by reacting acetone and formaldehyde in the mole ratio of at least 2 of the latter to 1 of the former, said polyamino compound characterized as follows: when a mixture consisting of 94 grams of hydroxybenzene and a number of grams of said compound equal to its molecular weight divided by the number of amino groups therein is heated to 150° C. and maintained at that temperature for 4 hours, at the end of that period the resultant mass is liquid at 150° C.; and when 1 mole of said compound and 2 moles of aqueous formaldehyde (37% conc.) are heated to 90° C. and maintained at that temperature for about 10 minutes, at the end of that period the mass is water soluble; said compound being capable of being reacted with said acetone-formaldehyde resinous reaction product in the presence of water to produce homogeneous water-containing solid mass resistant to water.

References Cited in the file of this patent

UNITED STATES PATENTS

| | | |
|---|---|---|
| 2,364,900 | Hessel et al. | Dec. 12, 1944 |
| 2,492,212 | Dailey | Dec. 27, 1949 |
| 2,538,884 | Schrimpe | Jan. 23, 1951 |
| 2,683,133 | Harvey et al. | July 6, 1954 |
| 2,828,820 | Harvey | Apr. 1, 1958 |
| 2,839,487 | Rosamilia et al. | July 17, 1958 |